United States Patent Office

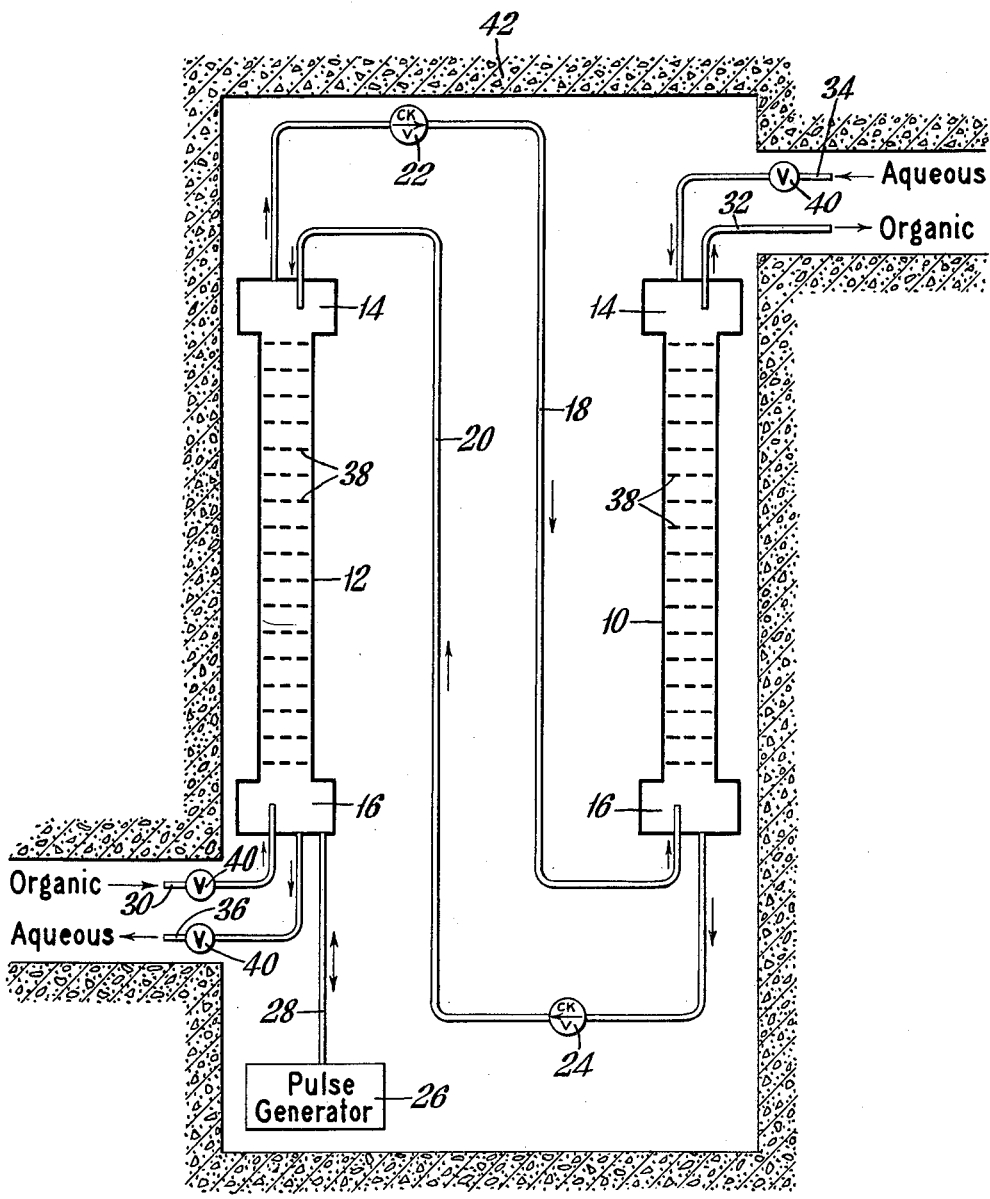

3,085,864
Patented Apr. 16, 1963

3,085,864
LIQUID-LIQUID CONTACTING COLUMNS
Alwyne C. Jealous, 141 Holmes Ave., Darien, Conn.
Filed Sept. 20, 1956, Ser. No. 610,951
4 Claims. (Cl. 23—270.5)

The present invention relates to improvements in liquid-liquid contacting columns such as columns employed in solvent extraction processes. The invention is especially applicable to use in solvent extraction processes involving radioactive materials that require the employment of personnel shielding means in combination with the liquid-liquid contacting columns.

Heretofore, single liquid-liquid contacting columns have been proven very useful in solvent extraction processes. At times the process requirements have demanded the employment of single columns of extremely great height. In ordinary applications, the great height of such liquid-liquid contacting column presents space and maintenance problems. In addition, when radioactive materials are to be processed in columns of great height, shielding problems become quite complicated and extensive due to the requirement of tall sheilding structures.

It is, therefore, the prime object of the present invention to provide apparatus for liquid-liquid contacting columns of low structural height requirements and which, when employed to process radioactive materials, will permit the attainment of adequate shielding with a minimum of shielding structure.

Other aims and advantages of the invention will be apparent from the following description and appended claims.

In accordance with the present invention, a concatenated, pulsed liquid-liquid contacting column is provided comprising a plurality of column sections arranged in series and provided with means for delivering pressure pulses to the liquids in the concatenated system to provide intimate contact between the liquid phases passed through the column.

The single FIGURE of the drawing is a schematic view showing a two-section shielded, concatenated, pulsed extraction column for processing, in countercurrent flow relation, an aqueous and an organic phase, one of which is radioactive.

Referring specifically to the embodiment of the drawing, a shielded, concatenated, pulsed, extraction column is provided comprising sections 10 and 12 of approximately equal length and mounted side by side. Sections 10 and 12 are each provided with settling portions 14 and 16 at the top and bottom respectively. Transfer conduits 18 and 20 containing appropriate check valves 22 and 24, respectively, to limit the direction of flow between sections 10 and 12 of the column. A pulse generator 26, such as a double acting piston or the like, is connected to a section 12 of the column through conduit 28 which transmits reciprocating pressure pulses to the liquid phase throughout the entire system.

Two immiscible liquids, such as an aqueous and an organic liquid, may be passed in countercurrent relationship through the concatenated column. The organic phase may be introduced through conduit 30 into the settling portion 16 of column section 12 and upon passage through the column, to the upper settling portion 14 of column 10, is withdrawn from the system through outlet conduit 32. Concurrently therewith, the aqueous phase is introduced into the settling portion 14 of column 10 and is discharged from settling portion 16 of column section 12 through conduit 36.

On the pressure pulse, the check valve 22 opens permitting the flow of the organic phase from the "lower" section 12 into the "upper" section 10 of the concatenated column. On the suction pulse, check valve 24 opens allowing an aqueous phase to flow from the "upper" section 10 into the "lower" section 12.

The interior of sections 10 and 12 may contain conventional perforated metallic plates 38 such as stainless steel or other metallic materials, either uncoated or coated with a suitable material such as plastic.

Valve means 40 are provided to regulate the flow of aqueous and organic feed solutions so that an interface between the lighter and heavier phases can be maintained at any desired position with the concatenated column.

The settling chambers 14 and 16 are respectively provided at the upper and lower ends of each column section to minimize stable emulsion formation.

It has been found that a series of concatenated column sections, arranged in accordance with present invention to effect a reduction in overall height of columns, can be very easily shielded such as by an enclosing structure 42 of concrete or the like when employed for the processing of radioactive material.

In an example of the operation of apparatus embodying the invention, an organic phase comprising 22.5 percent tributyl phosphate and 77.5 percent paraffinic hydrocarbon diluent (containing about 64.5 grams of uranium per liter) was fed into a concatenated pulsed column of the type shown in the embodiment of the drawing employing two, 4-foot sections. Each section was 2-inches in diameter and had 4-inch diameter settling sections. The transfer conduits were ½ inch in diameter. The uranium was stripped from the organic phase with water and the column was operated with a continuous aqueous phase. The organic aqueous feed ratio was 2:3 and the feed rate was varied from 412 gal./ft.$^2$-hr. to 825 gal./ft.$^2$-hr. The column was pulsed at a rate of 60 cycles per minute and the amplitude of the pulses in the column was 1-inch. Samples were collected, over 30 minutes and the average sample indicated that the uranium content of the aqueous product was about 40.5 grams per liter and that of the organic phase was about 0.113 gram per liter. The uranium loss was calculated as 0.175 percent and the material balance was 94.3 percent.

It had previously been found that an equivalent 8-foot tall, non-concatenated pulsed column operated under otherwise identical conditions had produced higher uranium losses.

In another example of operation of apparatus of the invention to effect the partition of thorium and uranium, six, 6-foot sections (two sections for scrubbing and four sections for stripping) were employed. The organic feed contained about 70 grams per liter thorium and 0.2 gram per liter of uranium. The scrubbing agent was 41 percent tributyl phosphate and 59 percent paraffinic hydrocarbon diluent. The stripping agent was 0.25 normal nitric acid. With a pulse rate of 50 cycles per minute, an amplitude of 1.0 inch and a flow rate of approximately 1000 gal./ft.$^2$-hr., a thorium separation factor (from uranium) of about 1000 was obtained. The thorium loss was about 0.015 percent and the uranium loss was about 0.06 percent. The flow ration of feed:scrub:strip was 1:1:5.

In a further example of the apparatus of the invention, a pulsed, concatenated column was applied in a system incorporating 5-inch diameter sections.

By using the concatenated column of the invention, it was possible to install a 3-section column providing an overall contacting length of 45 feet within a concrete shielded cell having a maximum head room only 20 feet in height.

What is claimed is:
1. Liquid-liquid contacting apparatus comprising a plurality of contacting column sections containing internal contacting elements; conduit means communicating between successive column sections to provide for counter- current flow of said liquids through column sections arranged to operate in series; inlet and outlet means for passing two liquid phases in countercurrent relationship through said pluraltiy of column sections and conduit means arranged in series; hydraulic pulse generator means associated with one of said column sections to provide alternating hydraulic pressure pulses through the liquid contained in said column sections; and check valve means positioned in said conduit means and actuated by said alternating hydraulic pressure pulses to permit the conduction of said pressure pulses through said conduit means to each of said column sections.

2. Apparatus for contacting two liquid phases at least one of which is radioactive comprising a plurality of contacting column sections containing internal contacting elements; conduit means communicating between successive column sections to provide for countercurrent flow of said liquid phases through column sections arranged to operate in series; inlet and outlet means for passing two liquid phases in countercurrent relationship through said plurality of column sections and conduit means arranged in series, hydraulic pulse means associated with one of said column sections to provide alternating hydraulic pressure pulses through the liquid contained in said column sections; check valve means positioned in said conduit means and actuated by said alternating hydraulic pressure pulses to permit the conduction of said pressure pulses through said conduit means to each of said column sections; and structural means positioned about said column sections, said conduit means, and said pulse generator means to shield operating personnel from the radioactive energy emitted from the radioactive material in said column.

3. Liquid-liquid contacting apparatus comprising a plurality of contacting column sections; at least one pair of conduits communicating between the outlet end of each column section and the inlet end of the next successive column section to provide for countercurrent flow of said liquids through all of said column sections arranged to operate in series; inlet and outlet means of communicating with both the first and last of said plurality of contacting column sections for passing two liquid phases in countercurrent relationship through said plurality of column sections and conduits arranged in series; hydraulic pulse generator means associated with at least one of said column sections to provide alternating hydraulic pressure pulses through the liquid contained in said column sections; and check valve means positioned in each of said conduits and actuated by said alternating hydraulic pressure pulses to permit the conduction of said pressure pulses through said conduits to each of said column sections and to permit the desired unidirectional flow of one liquid phase through each of said conduits.

4. Apparatus for contacting two liquid phases at least one of which is radioactive comprising a plurality of contacting column sections; at least one pair of conduits communicating between the outlet end of each column section and the inlet end of the next successive column section to provide for countercurrent flow of said liquid phases through all of said column sections arranged to operate in series; inlet and outlet means communicating with both the first and last of said plurality of contacting column sections for passing two liquid phases in countercurrent relationship through said plurality of column sections and conduit means arranged in series, hydraulic pulse means associated with at least one of said column sections to provide alternating hydraulic pressure pulses through the liquid contained in said column sections; check valve means positioned in each of said conduits and actuated by said alternating hydraulic pressure pulses to permit the conduction of said pressure pulses through said conduits to each of said column sections and to permit the desired unidirectional flow of one liquid phase through each of said conduits; and structural means positioned about said column sections, said conduits inlet and outlet means and said pulse generator means to shield operating personnel from the radioactive energy emitted from the radioactive material in said column.

References Cited in the file of this patent

UNITED STATES PATENTS

| 2,743,170 | Burger | Apr. 24, 1956 |
| 2,751,425 | Rupp | June 19, 1956 |

OTHER REFERENCES

Proceedings United Nations International Conference on Peaceful Uses of Atomic Energy, vol. 9 (Reactor Technology and Chemical Processing), pages 479–483.

Sci. American, vol. 187, No. 1, July 1952, pages 62–67. Photocopy Div. 46.

Chemical Eng. Progress, August 1954, pages 396–402.